(12) United States Patent
Burd

(10) Patent No.: US 10,124,894 B2
(45) Date of Patent: Nov. 13, 2018

(54) AIRCRAFT GALLEY CHILLED AIR DISTRIBUTION SYSTEM

(71) Applicant: B/E Aerospace, Inc., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 937 days.

(21) Appl. No.: 13/852,631

(22) Filed: Mar. 28, 2013

(65) Prior Publication Data
US 2013/0260662 A1 Oct. 3, 2013

Related U.S. Application Data

(60) Provisional application No. 61/618,527, filed on Mar. 30, 2012.

(51) Int. Cl.
*B64D 11/00* (2006.01)
*B62B 5/00* (2006.01)
(Continued)

(52) U.S. Cl.
CPC .......... *B64D 11/0007* (2013.01); *B62B 3/003* (2013.01); *B62B 5/00* (2013.01);
(Continued)

(58) Field of Classification Search
CPC ....... B62B 3/003; B62B 5/00; B62B 2202/67; B62B 2204/04; B64D 2013/0629; F25D 2317/063
(Continued)

(56) References Cited

U.S. PATENT DOCUMENTS 4,969,509 A * 11/1990 Merensky .............. B64D 13/08
165/104.34
5,397,010 A    3/1995 Gibot
(Continued)

FOREIGN PATENT DOCUMENTS

DE    3812739 C1    7/1989
DE    60107814 T2    12/2005
(Continued)

OTHER PUBLICATIONS

EPO, International Search Report and Written Opinion from counterpart International Patent Application No. PCT/US2013/034621.
(Continued)

*Primary Examiner* — Gregory Huson
*Assistant Examiner* — Dana Tighe
(74) *Attorney, Agent, or Firm* — Donna P. Suchy

(57) ABSTRACT

A chilled air distribution system for an aircraft galley service cart, comprising a first plenum on an upper surface of the service cart for directing chilled air over said cart. The cart bay door also includes a pair of diverting curved vanes along a vertical surface to divert air from one surface, such as a front door, to an adjacent surface such as a side wall. The side walls may be provided with a pair of rub strips for guiding air to the rear of the cart, where a return plenum vacuums and recirculates the chilled air back to the first plenum.

6 Claims, 3 Drawing Sheets

(51) Int. Cl.
*B62B 3/00* (2006.01)
*B64D 13/06* (2006.01)

(52) U.S. Cl.
CPC ....... *B62B 2202/67* (2013.01); *B62B 2204/04* (2013.01); *B64D 2013/0629* (2013.01); *F25D 2317/063* (2013.01)

(58) Field of Classification Search
USPC .......................... 454/76, 143, 188, 193, 370
See application file for complete search history.

(56) References Cited

U.S. PATENT DOCUMENTS

| | | | |
|---|---|---|---|
| 5,655,595 | A | 8/1997 | Westbrooks, Jr. |
| 5,947,812 | A * | 9/1999 | Henning ................... B60P 3/20 454/118 |
| 6,073,547 | A | 6/2000 | Westbrooks, Jr. et al. |
| 6,315,039 | B1 | 11/2001 | Westbrooks, Jr. et al. |
| 6,684,657 | B1 | 2/2004 | Dougherty |
| 6,845,627 | B1 | 1/2005 | Buck |
| 7,025,121 | B2 | 4/2006 | Whitehead et al. |
| 7,231,778 | B2 | 6/2007 | Rigney et al. |
| 7,458,441 | B2 * | 12/2008 | Hu ............................ B62B 5/00 186/45 |
| 7,967,249 | B2 | 6/2011 | Mühlthaler et al. |
| 2005/0028543 | A1 | 2/2005 | Whitehead et al. |
| 2009/0301120 | A1 | 12/2009 | Godecker et al. |
| 2010/0050665 | A1 | 3/2010 | Oswald et al. |

FOREIGN PATENT DOCUMENTS

| | | | |
|---|---|---|---|
| DE | 102006017012 A1 | 10/2007 | |
| EP | 0591047 A1 | 4/1994 | |
| ES | 2380833 T3 | 5/2012 | |
| FR | 2696158 A1 | 4/1994 | |
| GB | 1526160 A | 9/1978 | |
| GB | 1595961 A | 8/1981 | |
| JP | 2001301624 A | * 10/2001 | ............. A47B 31/02 |
| JP | 2001301624 A | 10/2001 | |
| JP | 2007537077 A | 12/2007 | |
| JP | 2009533265 A | 9/2009 | |
| WO | 0158788 A1 | 8/2001 | |
| WO | 2005063566 A2 | 7/2005 | |

OTHER PUBLICATIONS

International Preliminary Report on Patentability dated Oct. 1, 2014 for PCT/US2013/034621.

* cited by examiner

AIRCRAFT GALLEY CHILLED AIR DISTRIBUTION SYSTEM

CROSS-REFERENCES TO RELATED APPLICATIONS

This application claims priority from U.S. Application No. 61/618,527, filed Mar. 30, 2012, incorporated herein by reference in its entirety.

BACKGROUND

Commercial or passenger aircraft that transport large numbers of passengers include a galley for food and beverage service. The galley of an aircraft includes a number of systems to store, prepare, serve, and dispose of food and beverage products and waste. These galleys are always striving to become more efficient and balance competing factors such as cost, weight, space, and effectiveness. One of the more important systems on an aircraft's galley is the refrigeration system. Refrigeration systems must adhere to requirements for weight and space, and be effective enough to maintain perishables and other food products at a temperature needed to maintain viability.

To successfully meet the mandated requirements for preserving perishable food stuffs that may be prepared and served to passengers of short range, long range, and ultra-long range commercial aircraft flights, it is essential that the refrigeration system effectively distribute chilled air around a compartment containing removable carts or trolleys or a compartment containing fixed or removable shelves. To achieve this, specific air distribution devices are used to ensure that all areas of the chilled compartment receive an air flow of adequate quantity to maintain the food stuffs at a pre-determined temperature, regardless of the location of the compartment and the varying external heat loads and galley or trolley design

SUMMARY OF THE INVENTION

The present invention is a chilled air distribution system that ensures that the airflow from a chilled air source is distributed over all areas of the cart, trolley or shelved food stuffs evenly, guaranteeing maintenance of the selected temperature and preventing the food from becoming hazardous to health. The location and principals of the invention are factors in achieving this effective distribution.

The airflow distribution is achieved using vanes on an aircraft galley cart bay door, that redirects airflow from a front of the cart to the sides, and a combination of castelated and plain rub strips that maintain the airflow along the sides to the back of the cart. An air supply plenum is positioned along the top of the cart and a return plenum at the rear to recirculate the chilled air, creating an airflow pattern that continuously and consistently chills the surfaces of the galley cart.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
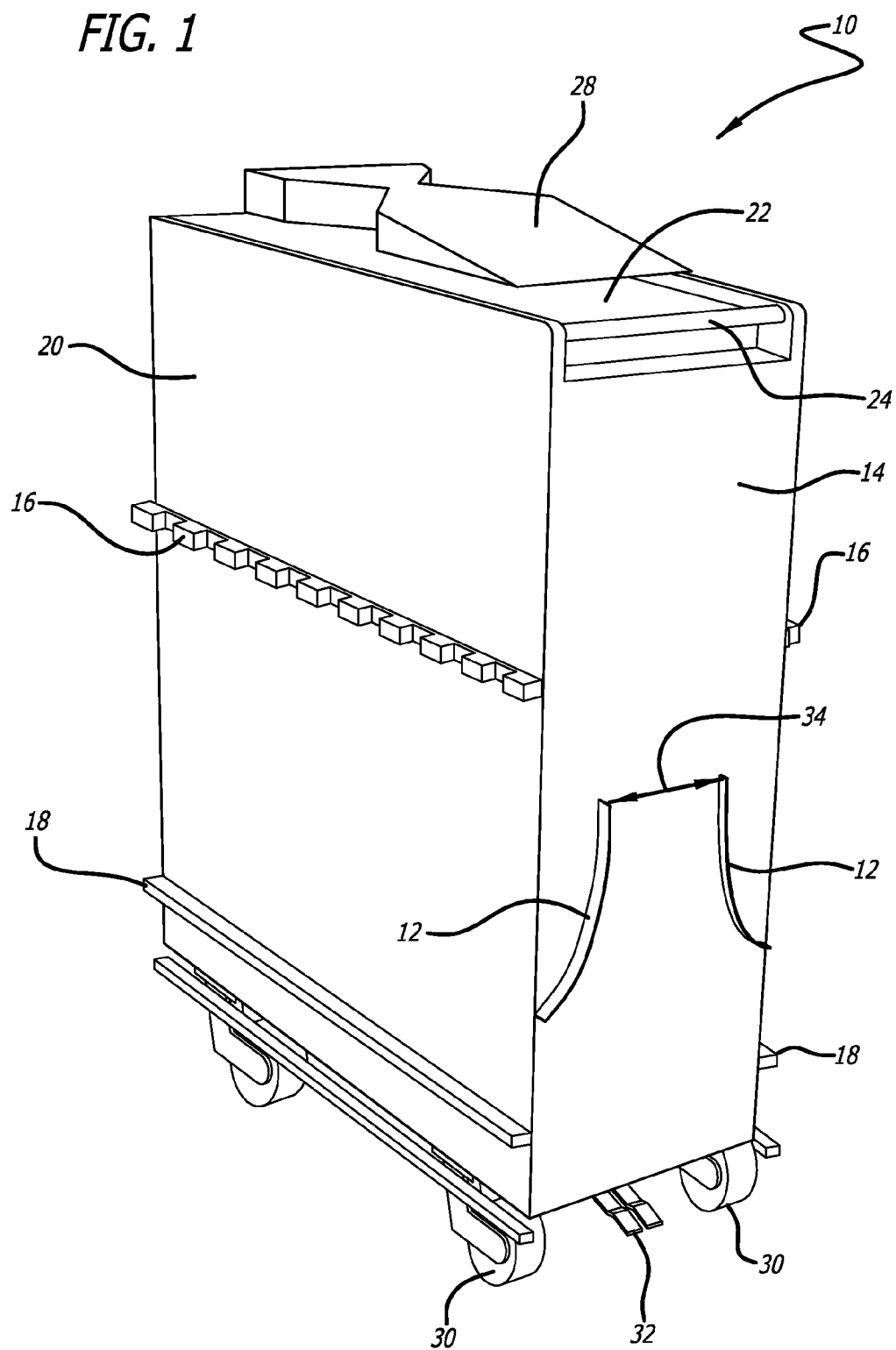
FIG. 1 is an elevated, perspective front view of a first preferred embodiment.

FIG. 1 illustrates a beverage or meal cart 10 that would typically be stored in a galley storage compartment where chilled air is circulated over the cart 10 to maintain the cart at a predetermined temperature level. The cart has a front wall 14, side walls 20, a top surface 22 including a handle bar 24, and a rear surface 26. The cart 10 includes wheels or casters 30 that allow a flight attendant to roll the cart down the aisle of the aircraft so that passengers can be serviced, and brakes 32 to fix the cart 10 in place to prevent the cart from rolling away during turbulence. The cart 10 is designed to hold a plurality of meal packages or beverages, and thus must be maintained at a temperature below ambient. To maintain the temperature of the cart 10, it is placed in a compartment in the galley where cold air is delivered, typically through a compartment air inlet at the rear of the compartment.

To distribute cold air over the entirety of the cart, an upper plenum 28 collects cold air from the chilled air source in the galley compartment and directs the air along the upper surface 22 in a rearward to frontward direction of the cart 10. Once the cool air reaches the end of the upper surface 22 of the cart, the compartment door (not shown) forces the chilled air downward along the front wall 14. In the present invention, the cart bay door 14 is equipped with curved air turning vanes 12 that redirect downward airflow along the front door 14 to horizontal airflow along the sides of the cart 10. Along a horizontal midline of the cart's side walls 20 is a castellated rub strip 16, and a non-castellated rub strip 18 may also be disposed along the lower portion of the side wall 20. The suction provided by the hole pattern 33 in the chilled air return plenum (duct) 21 draws the air through the castellated rub strip 16, down and along the non-castellated rub strip 18, and down the sides 20 of the cart 10. Further, the open bottom of the plenum 21 and the gap 34 between the turning vanes 12 ensures adequate airflow on the underside 36 of the cart 10. This principle can also provide even air distribution for chilled compartments with shelves or chilled compartments containing standard units (meal box or SU).

Figure 2:
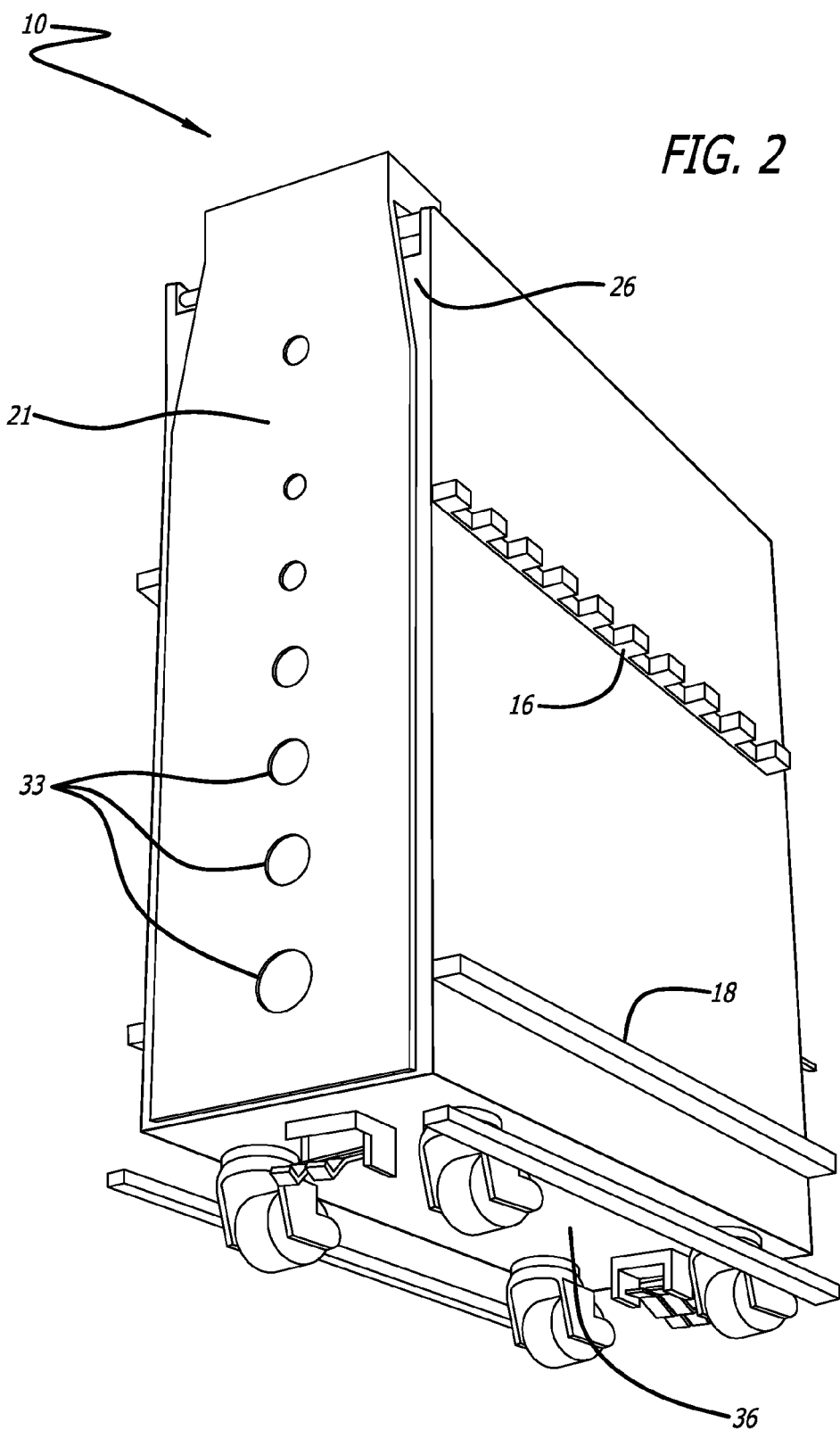
FIG. 2 is a perspective rear view of the embodiment of FIG. 1 from below.

Computational fluid dynamic analysis of the airflow over the cart for the configuration of FIGS. 1 and 2 show the effect on temperature compared to carts with no such devices. The analysis shows that the present invention eliminates hot spots that form on the sides of the cart where no vanes are used. To meet mandated requirements, a large percentage of the surface temperature of the cart must remain below 4 degrees C. (39 degrees F.). The present invention ensures this requirement is met, whereas the computational fluid dynamic analysis demonstrates that the requirements are not met without the present invention.

The cooling effect of the present invention results in the ability of the chiller requirements to reduce the airflow by 50%, and the ability of the invention to maintain an effective cooling pattern despite the reduced air flow. For example, without the present invention an airflow of 29.5 liters/second was required to maintain adequate cooling, whereas in with the present invention an airflow of 14.75 liters/second was sufficient. Thus, the present invention reduces the demand on the cooling system by reducing the required airflow while preventing unwanted hot spots along the food carts.

The action of the airflow return plenum at the rear of the compartment is not limited to the orientation shown, but may be reversed to provide suction from the bottom of the compartment upwards, the hole pattern being adjusted to re-balance the airflow. Similarly, the airflow into the compartment itself may be reversed, entering at the bottom and being returned via a plenum providing suction from the top of the compartment. Likewise, the turning vanes on the back of the compartment doors may be inverted, re-positioned or duplicated to suit that particular compartments airflow. The design of the chilled air supply and return system need not be limited to an individual cart location, but could be combined to form an integrated or "combined" system covering a number of locations.

Thus, the air flow controlling vanes of the present invention can be mounted on or built into the front of the chilled cart door, and/or positioned in such a way as to turn the airflow down the sides of the cart (trolley), SU, shelved food or containerized alcoholic or non-alcoholic beverages. Castellated rub strips further allow partial flow through and along their length and down the sides of the cart (trolley). A plenum chamber (duct) with centralized suction apertures is positioned to allow controlled extraction of the chilled air in a pattern that provides effective cooling of each cart.

Figure 3:
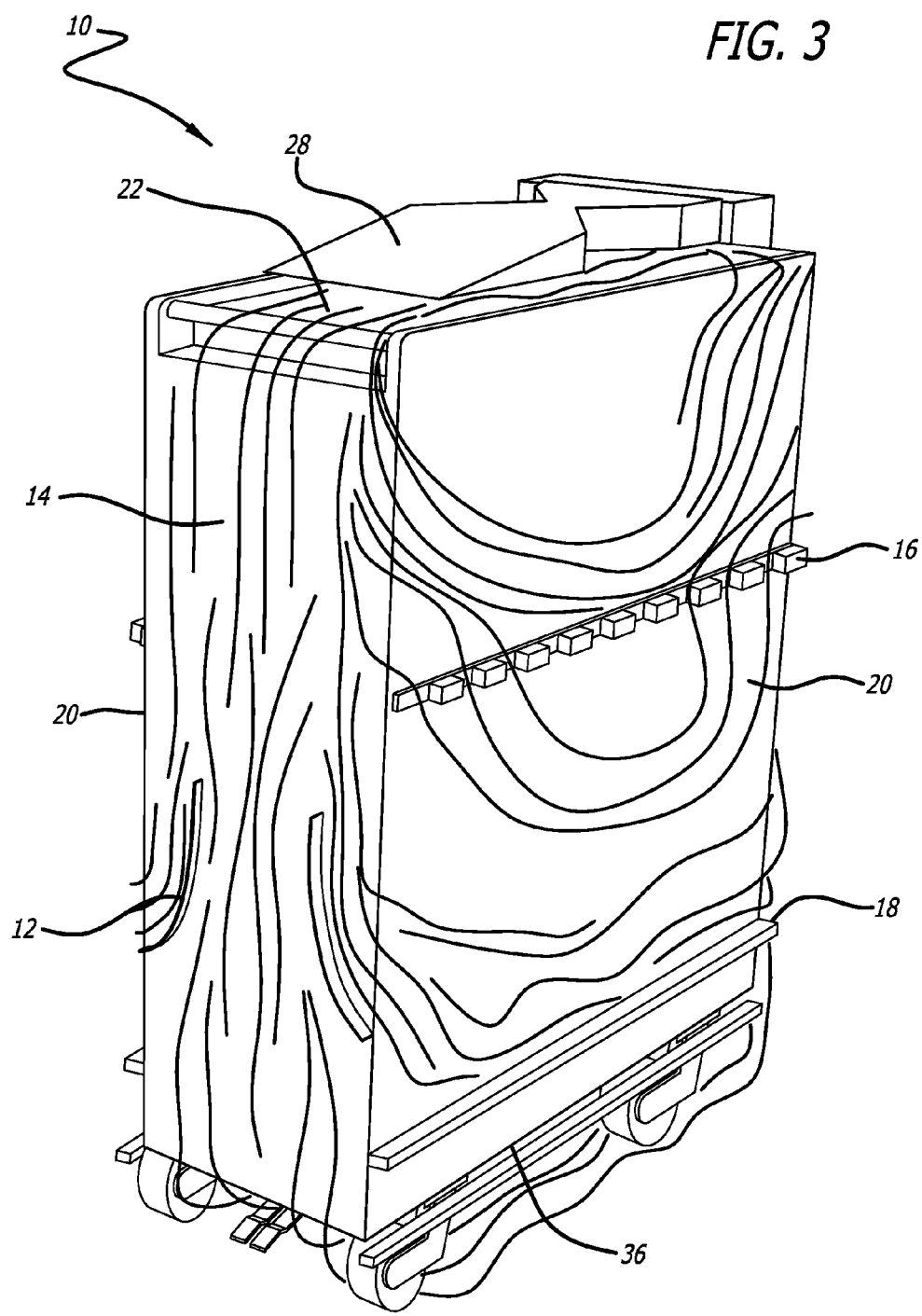
FIG. 3 is a perspective view showing air flow patterns over the cart when the embodiment of FIG. 1 is used.

FIG. 3 illustrates an airflow pattern that that results when the present invention is used. Air, depicted by airflow lines as shown, enter the upper plenum 28 and flow over the upper surface 22 and down the front wall 14. Some of the air passes between the vanes 12 all the way to the bottom 36 of the cart, while the remaining air impinges the vanes 12 and is diverted to the side walls 20 as shown. The suction from the chilling system pulls the air across the side walls 20, along the non-castellated rub strip 18, partially through the castellated rub strip 16, and back to the rear of the cart. In this manner, airflow is provided over the entire surface of the cart 10, ensuring adequate temperature control and preventing hot spots on the cart.

It will be apparent from the foregoing that while particular forms of the invention have been illustrated and described, various modifications can be made without departing from the spirit and scope of the invention. Accordingly, it is not intended that the invention be limited, except as by the appended claims.

I claim:

1. A chilled air distribution system for an aircraft galley service cart, comprising:
   a service cart housing having a front door, a pair of side walls, an upper surface, a lower surface, and a rear wall;
   a first plenum on said upper surface for directing chilled air over said cart;
   a pair of diverting curved vanes along a vertical surface to divert the chilled air from the vertical surface to an adjacent surface;
   a pair of rub strips on the adjacent surface for guiding the chilled air to another adjacent surface; and
   a return plenum on the another adjacent surface for recirculating the chilled air to the first plenum,
   wherein one of the pair of rub strips is castellated.

2. The chilled air distribution system of claim 1, wherein one of the pair of rub strips is non-castellated.

3. The chilled air distribution system of claim 1, where the pair of diverting curved vanes divert the chilled air flowing over the front door of the service cart to the side walls of the service cart.

4. The chilled air distribution system of claim 3, where the pair of diverting curved vanes are spaced apart to allow some of the chilled air to pass therebetween.

5. The chilled air distribution system of claim 1, wherein the return plenum includes a plurality of spaced apart holes for the chilled air to pass through via suction.

6. The chilled air distribution system of claim 5, wherein a number of the spaced apart holes is selected to control the flow of the chilled air about the service cart.

* * * * *